(12) United States Patent
de Walle et al.

(10) Patent No.: US 12,539,759 B2
(45) Date of Patent: Feb. 3, 2026

(54) STEERING APPARATUS FOR A MOTOR VEHICLE

(71) Applicant: Dr. Ing. h.c. F. Porsche Aktiengesellschaft, Stuttgart (DE)

(72) Inventors: Doeke de Walle, Pforzheim (DE); Ralf Ahlburg, Weil der Stadt (DE); Tarek Ashour, Stuttgart (DE); Dominic Arnold, Gerlingen (DE)

(73) Assignee: DR. ING. H. C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 18/649,044

(22) Filed: Apr. 29, 2024

(65) Prior Publication Data
US 2024/0408962 A1 Dec. 12, 2024

(30) Foreign Application Priority Data
Jun. 7, 2023 (DE) .......................... 102023115000.6

(51) Int. Cl.
*B60K 35/22* (2024.01)
*B62D 1/04* (2006.01)
*B62D 1/10* (2006.01)
*B62D 1/185* (2006.01)

(52) U.S. Cl.
CPC .............. *B60K 35/22* (2024.01); *B62D 1/046* (2013.01); *B62D 1/10* (2013.01); *B62D 1/185* (2013.01); *B60K 2360/1438* (2024.01); *B60K 2360/167* (2024.01); *B60K 2360/178* (2024.01); *B60K 2360/332* (2024.01); *B60K 2360/782* (2024.01)

(58) Field of Classification Search
CPC ................................................ B60K 2360/782
See application file for complete search history.

(56) References Cited

U.S. PATENT DOCUMENTS

| | | | | |
|---|---|---|---|---|
| 5,691,695 | A * | 11/1997 | Lahiff .................... | B60K 35/22 340/459 |
| 5,821,935 | A * | 10/1998 | Hartman ................ | B60K 35/22 340/438 |
| 6,070,686 | A | 6/2000 | Pollmann | |
| 6,360,149 | B1 * | 3/2002 | Kwon .................... | G06F 3/0202 172/278 |
| 2009/0189373 | A1 * | 7/2009 | Schramm .......... | B60R 21/21658 280/731 |
| 2014/0062891 | A1 * | 3/2014 | Powell ................... | B60K 35/22 345/173 |

(Continued)

FOREIGN PATENT DOCUMENTS

| | | | | |
|---|---|---|---|---|
| DE | | 3817613 A1 | 12/1990 | |
| DE | | 4328564 C1 * | 8/1994 | ......... B60R 21/2032 |

(Continued)

*Primary Examiner* — Daniel D Yabut
(74) *Attorney, Agent, or Firm* — LEYDIG, VOIT & MAYER, LTD.

(57) ABSTRACT

A steering apparatus (2) for a motor vehicle has a handle (4) set up to be grasped by the hands of a driver of the motor vehicle during an operation of the steering apparatus (2). A hub (6) connects the steering apparatus (2) to a steering column of the motor vehicle and spokes (8) connect the handle element (4) to the hub body (6). The hub (6) has at least one digital display (10) for displaying operating parameters of the motor vehicle.

10 Claims, 1 Drawing Sheet

(56) References Cited

U.S. PATENT DOCUMENTS

| | | | | |
|---|---|---|---|---|
| 2015/0286385 | A1* | 10/2015 | Kim | B62D 1/046 |
| | | | | 340/461 |
| 2016/0001807 | A1* | 1/2016 | Hans | B60R 21/21656 |
| | | | | 74/484 R |
| 2016/0375770 | A1* | 12/2016 | Ryne | B60K 35/215 |
| | | | | 701/23 |
| 2016/0375924 | A1* | 12/2016 | Bodtker | B62D 1/10 |
| | | | | 74/552 |
| 2019/0071112 | A1* | 3/2019 | Toddenroth | B60K 35/10 |

FOREIGN PATENT DOCUMENTS

| | | | | |
|---|---|---|---|---|
| DE | 102006053176 A1 | | 5/2007 | |
| DE | 202009001077 U1 | | 6/2008 | |
| DE | 102013013058 A1 | * | 2/2015 | ............... B62D 1/18 |
| DE | 202017105444 U1 | | 11/2017 | |
| DE | 102023115013 A1 | * | 12/2024 | ............. B60K 35/53 |
| WO | WO-2016173932 A2 | * | 11/2016 | ......... G06F 3/04847 |

* cited by examiner

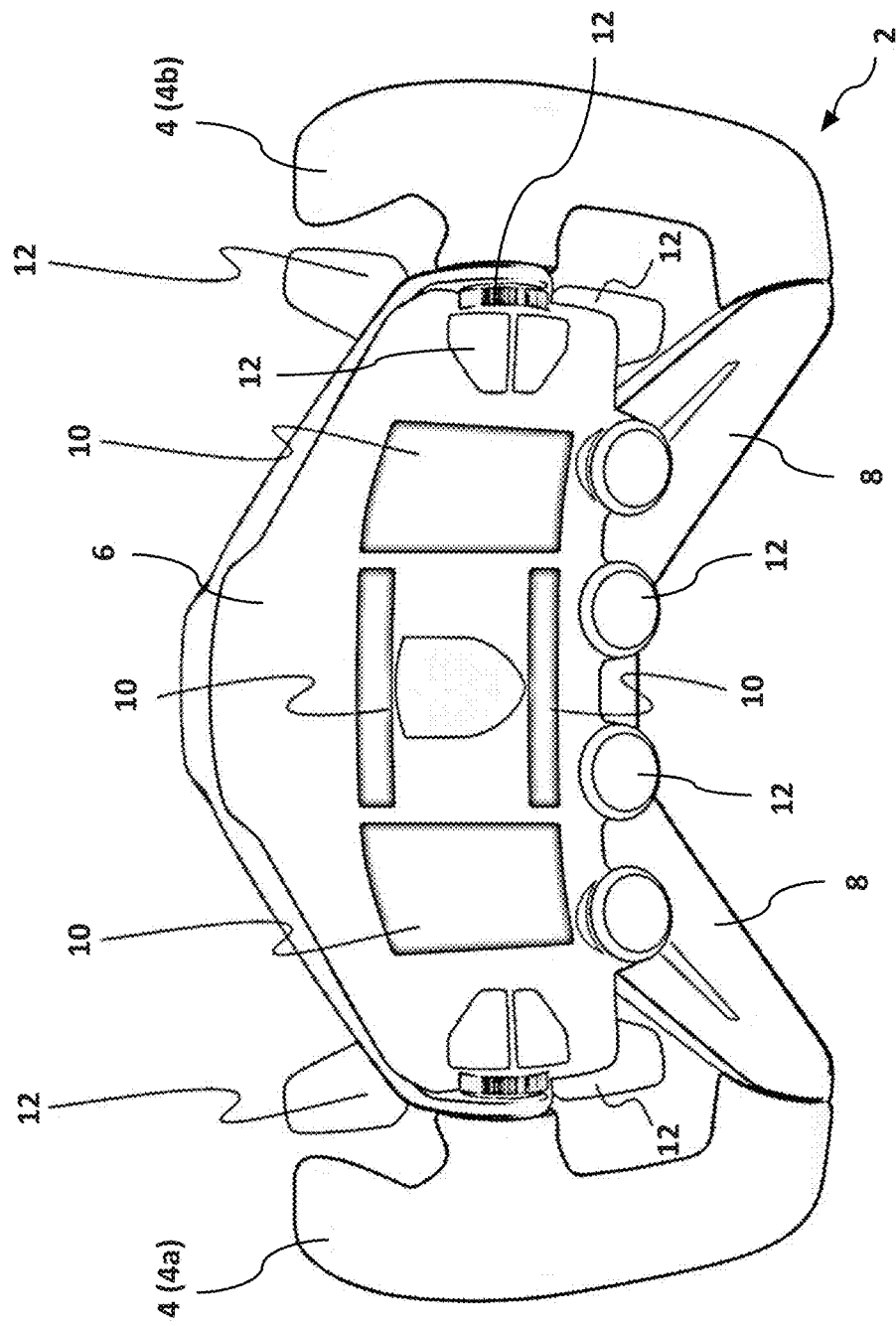

STEERING APPARATUS FOR A MOTOR VEHICLE

CROSS-REFERENCE TO RELATED APPLICATION

This application claims priority on German Patent Application No 10 2023 115 000.6 filed Jun. 7, 2023, the entire disclosure of which is incorporated herein by reference.

FIELD OF THE INVENTION

The invention relates to a steering device for use in a motor vehicle as well as a motor vehicle comprising such a steering device.

BACKGROUND OF THE INVENTION

A known steering apparatus for a motor vehicle has at least one handle, a hub for connecting the steering device to a steering column of the motor vehicle, and spokes for connecting the handle to the hub.

Motor vehicles also have display units that display important information to the driver, such as current travel speed, current rotational speed or warnings. Motor vehicles further have instrument panels via which settings can be made on a motor vehicle during a journey.

Disadvantageously, display units of motor vehicles typically are arranged in the dashboard of a motor vehicle, and parts of the display unit often are obscured by the hands or arms of the driver during a steering operation. This typical disposition of displays may pose a safety-related problem, particular for faster vehicles, such as racing cars, where drivers rely on an almost unrestricted view of the display unit. Instrument panels that enable adjustments to a motor vehicle to be made during a journey, typically are in the center console of a motor vehicle. Making adjustments is generally a distraction for the driver and is associated with some risk.

Therefore, an object of the invention is to remedy the disadvantages described above. In particular, an object of the invention is to provide a steering apparatus that can be implemented in a simple and cost-effective manner for use in a motor vehicle, and that improves driving safety, especially at higher speeds of a motor vehicle.

Technical features and details that are disclosed below in connection with the steering device of the invention also apply to the motor vehicle of the invention, and vice versa, so that reference is or can always be made mutually with respect to the disclosure regarding the individual aspects of the invention.

SUMMARY OF THE INVENTION

One aspect of the invention relates to a steering apparatus for a motor vehicle. The steering apparatus comprises a handle element set up to be grasped by the hands of a driver of the motor vehicle during operation of the steering means. The steering apparatus disclosed herein also comprises a hub for connecting the steering apparatus to a steering column of the motor vehicle and spokes for connecting the handle to the hub. The hub comprises at least one digital display for displaying operating parameters of the motor vehicle.

The fact that the hub has at least one digital display for displaying operating parameters of the motor vehicle provides a constructively simple and inexpensive way to ensure that essential information is not obscured by the driver's hands during a steering operation of a vehicle. The steering apparatus disclosed herein can be used in racing vehicles with or without road permits. However, the steering apparatus of the invention may also be used on other motor vehicles, such as commercial vehicles or the like.

In the context of the invention, a steering apparatus can be understood to mean a steering wheel that is used by a driver for input or execution of a steering request. The steering apparatus may be configured to be rotatable with the steering column of a vehicle about a rotational axis of the steering column. The handle may be configured in the form of a steering wheel rim that a driver may grasp when exercising a steering operation. It is understood that in addition to an embodiment of a handle element as a steering wheel rim, other handle element shapes may be provided, such as dual-handle steering wheels with two handles. In the context of the invention, the hub can be understood as the central component of a steering apparatus connected to the steering column of a vehicle and containing various mechanical components, such as a steering wheel lock and an airbag.

To achieve a targeted and effective increase in the safety and comfort of a driver of a motor vehicle, the hub may comprise one or more digital displays for displaying operating parameters of the motor vehicle. The digital displays of some embodiments are distributed symmetrically along a surface of the hub. Plural digital displays enable a selective distribution of display content and thereby minimizes a distraction for a driver when reading a display. A symmetrical arrangement also provides an externally appealing appearance.

In addition, with regard to a targeted distribution of specific display content, it may be advantageous for the hub to have a plurality of digital displays for displaying operating parameters of the motor vehicle. The digital displays may differ in terms of the size of its surface. For example, a larger display may display a digital "scroll wheel" and two further buttons, and a display with a smaller surface may display, for example, four switches for different modes of operation.

To an increase user comfort and safety of a vehicle occupant, the at least one digital display may comprise a curved display. The curved display may curve in two directions and may be axis symmetrical in two directions. A curved or bent display may be curved both horizontally and vertically depending on the specific design of the display. In particular, a curved display provides a more immersive viewing experience as it approaches the natural field of view of the human eye and allows for greater peripheral vision. It can also improve viewing comfort by reducing reflections and distortions and expanding viewing angles.

In the context of increased safety and a high level of user comfort, the at least one digital display is configured to display at least one of: a current speed; a current rotational speed; a current fuel level; a current temperature, a current mileage; and/or an alert to signal issues.

With regard to a high-quality and flexible display of operating parameters of a motor vehicle, the at least one digital display may be an OLED (Organic Light Emitting Diode) display. It is understood that other electronic technologies, such as LCD (Liquid Crystal Display), LED (Light Emitting Diode), or TFT (Thin Film Transistor) may be used to display information as an alternative to an OLED technology.

To provide a driver with the ability to make settings in addition to displaying information, the at least one digital display can be a touch screen display and can be configured to control a display via touches. The touch function on vehicle touch screens can be capacitive or resistive. Capacitive touch screens are based on sensing the electrical charge produced by touching the display. They enable more precise and sensitive touch detection. Resistive touch screens, on the other hand, are made up of multiple layers that detect touch through pressure contact. They are typically slightly less sensitive, but can also be operated with gloves or pens.

Additional operating elements may be provided in some embodiments for carrying out definable or defined vehicle functions and create further possibilities for making functional settings of a driver of a motor vehicle, while distracting a driver as little as possible. The additional operating elements may comprise knobs, shift levers and/or scroll wheels arranged on the hub. These additional operating elements may be disposed and configured to enable the driver to be able to make adjustments only by using the thumbs and without letting the steering device out of the driver's hands.

The steering apparatus may be in the form of a steering wheel, such as a racing steering wheel that has a right and a left handle. A design in the form of a racing steering wheel or an insert in a racing vehicle is particularly advantageous with regard to an increased safety requirement.

The steering apparatus may be slidable along a rotational axis of the steering column, preferably by at least 20 cm, in particular by at least 30 cm. In this way, a steering device position may be adapted to the physical conditions of a driver, in particular the driver's arms, to provide a particularly high level of driving comfort.

The invention also relates to a motor vehicle with the above described steering apparatus. Thus, the motor vehicle according to the invention offers the same advantages as have been described in detail above with respect to the steering apparatus.

Further advantages, features, and details of the invention emerge from the following description, in which embodiments of the invention are described in detail with reference to the drawing. The features mentioned in the claims and in the description can be essential to the invention individually or in any combination.

BRIEF DESCRIPTION OF THE DRAWINGS

FIG. 1 a steering apparatus according to the invention for use in a motor vehicle according to a first embodiment.

DETAILED DESCRIPTION

FIG. 1 shows a steering apparatus 2 according to an embodiment of the invention for use in a motor vehicle. The steering apparatus 2 comprises a handle device 4 in the form of a racing steering wheel with a right and a left handles 4a, 4b set up to be grasped by the hands of a driver of the motor vehicle during operation of the steering apparatus 2. Furthermore, the steering apparatus 2 comprises a hub 6 for connecting the steering apparatus 2 to a steering column of the motor vehicle, as well as spokes 8 for connecting the handle 4 to the hub 6. The hub 6 comprises at least one digital display 10 for displaying operating parameters of the motor vehicle.

The hub 6 of this embodiment has plural digital displays 10 for displaying operating parameters of the motor vehicle. The digital displays are distributed symmetrically along a surface of the hub 6 and at least in part differ with regard to the size of their surface.

The digital displays 10 here comprise a curved display that is curved axis-symmetrically in two directions.

Furthermore, the digital display 10 preferably is configured to display at least one of the following operating parameters: a current speed; a current rotational speed (e.g. RPM); a current fuel level; a current temperature; a current mileage; and/or an alert to signal issues.

The digital display means 10 is configured in the form of OLED displays and as touch screen displays that control a display via touches.

Additional operating elements 12 are provided for carrying out definable or defined vehicle functions, and are configured in the form of knobs, shift levers and scroll wheels arranged on the hub 6.

The above explanation of the embodiments describes the invention solely in the context of examples. Of course, individual features of the embodiments can be freely combined with one another insofar as they are technically advantageous without departing from the scope of the invention.

The invention claimed is:

1. A steering apparatus (2) for a motor vehicle, comprising:
    two handles (4) set up to be grasped respectively by the hands of a driver of the motor vehicle during operation of the steering apparatus (2);
    spokes (8) connected respectively to the handles (4); and
    a hub (6) connecting the spokes (8) to a steering column of the motor vehicle,
    the hub (6) comprising plural digital displays (10) for displaying operating parameters of the motor vehicle, the plural digital displays (10) comprising at least one display curved both horizontally and vertically and being axis symmetrical in two directions to provide an immersive viewing that approaches a field of view of a human eye.

2. The steering apparatus of claim 1, wherein the digital displays (10) are distributed symmetrically along a surface of the hub (6).

3. The steering apparatus (2) of claim 1, wherein the digital displays (10) at least partially differ with regard to surface sizes.

4. The steering apparatus (2) of claim 1, wherein the digital displays (10) are set up to display at least one of: a current speed; a current rotational speed; a current fuel level; a current temperature; a current mileage; and an alert to signal issues.

5. The steering apparatus (2) of claim 1, wherein at least one of the digital displays (10) is configured in the form of an OLED display.

6. The steering apparatus (2) of claim 1, wherein at least one of the digital display (10) is configured in the form of a touch screen that set up to control a display via touches.

7. The steering apparatus (2) of claim 1, further comprising additional operating elements (12) for carrying out definable or defined vehicle functions, the additional operating elements (12) being at least one of knobs, switch levers and scroll wheels arranged on the hub (6).

8. The steering apparatus (2) of claim 1, wherein the handle (4) is configured as a racing steering wheel with right and left handles (4a, 4b).

9. The steering apparatus (2) of claim 1, wherein the steering apparatus (2) is slidable along a rotational axis of the steering column by at least 20 cm.

10. A motor vehicle (100) comprising the steering apparatus (2) of claim 1.

* * * * *